United States Patent

[11] 3,569,627

[72] Inventors Takeshi Nishimura Kodaira-shi; Tadaiku Yoneda, Kokubunji-shi; Kan Otake, Tanashi-shi, Japan
[21] Appl. No. 654,095
[22] Filed July 18, 1967
[45] Patented Mar. 9, 1971
[73] Assignees Kabushiki Kaisha Hitachi Seisakusho; Hitachi Denshi Kabushiki Kaisha Tokyo-To, Japan
[32] Priority July 20, 1966
[33] Japan
[31] 41/47037

[54] TELEVISION VERTICAL SYNCHRONIZING SIGNAL GENERATOR
5 Claims, 11 Drawing Figs.

[52] U.S. Cl. .......... 178/69.5
[51] Int. Cl. .......... H04n 5/06
[50] Field of Search .......... 178/69.5 (TV), 69.5 (G); 328/109, 110, 127, 55, 56, 66, 187; 331/50, 53, 55, 172, 173; 328/59, 60, 187; 307/269

[56] References Cited

UNITED STATES PATENTS

| | | | |
|---|---|---|---|
| 2,515,613 | 7/1950 | Schoenfeld .......... | 328/60 |
| 2,926,242 | 2/1960 | Feyzeau .......... | 178/69.5(G) |
| 2,930,848 | 3/1960 | Fathauer .......... | 178/69.5(G) |
| 3,387,221 | 6/1968 | Arberman et al. .......... | 328/163 |

*Primary Examiner*—Richard Murray
*Assistant Examiner*—Richard P. Lange
*Attorneys*—Jordan B. Bierman and Ernest F. Marmorek

ABSTRACT: A generator having a generator for producing rectangular waves having a period equal to 2N times a television horizontal scanning period and a 50-percent duty factor, a pulse generating circuit for generating from the rectangular waves two pulse trains respectively of a period of 2NH mutually differing in phase by NH, a delaying circuit for delaying one of the pulse trains by H/2, and a circuit for additively combining the two pulse trains to produce a composite pulse train which is used in conjunction with the horizontal synchronizing signal to accomplish interlaced scanning of a television picture.

INVENTORS:
TAKESHI NISHIMURA
TADAIKU YONEDA
KAN ŌTAKE

BY:

INVENTORS:
TAKESHI NISHIMURA
TADAIKU YONEDA
KAN ŌTAKE
BY:

INVENTORS:
TAKESHI NISHIMURA
TADAIKU YONEDA
KAN ŌTAKE
BY:
H. Edward Mestern

TELEVISION VERTICAL SYNCHRONIZING SIGNAL GENERATOR

This invention relates generally to methods and means for scanning of pictures in television and other uses. More particularly the invention concerns synchronizing signal generators for interlaced scanning and specifically to a new vertical synchronizing signal generator affording full interlaced scanning.

While interlaced scanning has heretofore been used as a scanning method in television, it is necessary, in order to obtain ample vertical resolution, to synchronize the horizontal and vertical scanning signals so that the scanning lines of the scanning in the second field scan the approximately central parts between the scanning lines of the scanning in the first field. For such complete laced scanning, it is necessary that a constant frequency relationship of nonintegral ratio be maintained between the horizontal and vertical synchronizing signals.

That is, in commercial television broadcasting in Japan, for example, it is necessary to use a vertical scanning frequency of 60 Hz. with respect to a horizontal scanning frequency of 15,750 Hz. As one method of obtaining this relationship, it has heretofore been the practice to generate a signal of a frequency which is two times the horizontal scanning frequency, i.e., 31,500 Hz., as a standard signal and to step down this standard signal to one-half on one hand to obtain the horizontal synchronizing signal and to 1/525 on the other hand to obtain the vertical synchronizing signal.

However, while this synchronization method is operationally complete, it requires the use of a large number of vacuum tubes or transisters and other electronic components, and is not only complicated but is also uneconomical. Accordingly, this method has heretofore been impractical for systems such as ordinary closed-circuit television for industrial uses and television telephones, in which there is a particular requirement for simplicity and economy. In view of this difficulty, therefor, the common scanning method employed in such systems as closed-circuit TV for industrial uses and TV telephones has been the so-called random interlacing method in which the horizontal scanning and the vertical scanning do not have a definite relationship.

By a method of this nature, there arise instances wherein the same parts of the picture plane scanned by the initial scanning lines are scanned by the succeeding scanning lines, and the scanning lines of the picture become substantially few in number, whereby the vertical resolution is greatly lowered.

It is an object of the present invention to provide apparatus for generating synchronizing signals for accomplishing full interlaced scanning with a simple and economical organization of apparatus in which complicated elements and arrangement, as were necessary heretofore, are not required.

The foregoing object and other objects and advantages as will become apparent as the disclosure proceeds have been achieved by the present invention which, briefly summarized, resides in a generator for generating a television vertical synchronizing signal for use in conjunction with a horizontal synchronizing signal to accomplish interlaced scanning, in which generator the operation comprises: generating rectangular waves of 50 percent duty factor having a period equal to 2N times (where N is an integer, preferably close to the number of scanning lines per field) the period H (equal to the horizontal scanning period) of the horizontal synchronizing signal; producing from these rectangular waves two pulse trains of a period of 2NH having respective phases mutually differing by NH; causing the phase of one of these pulse trains to be delayed by H/2 relative to the phase of the other; and then combining the pulse train of delayed phase with the other pulse train to produce the vertical synchronizing signal.

By this operation, the present invention affords full interlacing in a simple and economical manner, whereby the invention can be readily practiced in applications such as closed-circuit TV for industrial uses and TV telephones. At the same time, the invention affords substantial improvement in the vertical resolution of the television picture, whereby a picture of excellent quality is afforded.

The nature, principle, utility, and details of the invention will be more clearly apparent from the following detailed description with respect to preferred embodiments of the invention when read in conjunction with the accompanying drawings, in which like parts are designated by like reference numerals and characters.

In the drawings:

FIGS. 1, 3, and 7 are block diagrams showing signal generators constituting examples of preferred embodiment of the invention;

Figure 1:
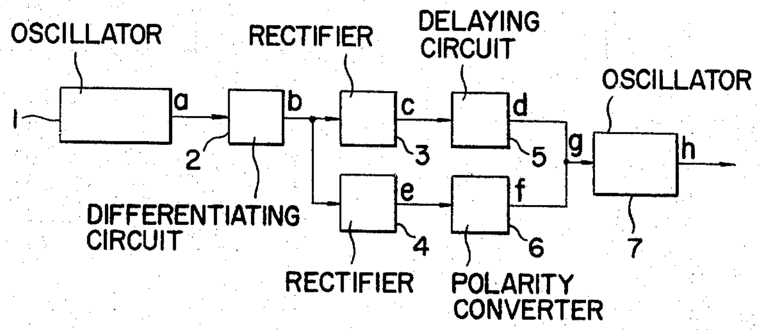

Referring first to FIG. 1, the example shown therein of the vertical synchronizing signal generator of the invention comprises, essentially, an oscillator 1 for generating rectangular waves of a duty factor of 50 percent having a period which is 2N times (where N is 262, for example) the period (for example, 1/15,750 second in commercial television) of a horizontal synchronizing signal, a differentiating circuit 2, rectifiers 3 and 4 mutually opposite polarity, a delaying circuit 5, a polarity converter 6, and an oscillator 7.

Figure 2:
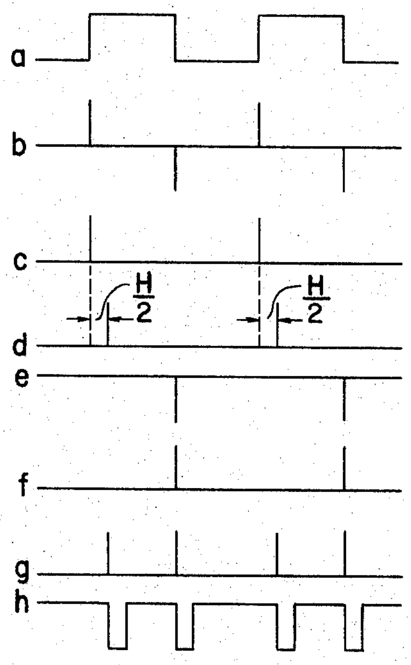
FIG. 2 is a graphical representation in the form of a time chart indicating voltage waveforms at various parts in the generator illustrated in FIG. 1.

The generator of the above-described organization operates in the following manner. Referring also to FIG. 2 indicating waveforms of voltages at various parts of the generator, the output voltage of the oscillator 1 generating rectangular waves is indicated by waveform *a* in FIG. 2. When this waveform is differentiated by the differentiating circuit 2, a pulse waveform *b* is produced. When this pulse waveform *b* is divided by rectifiers 3 and 4 into a positive pulse train and a negative pulse train, pulse waveforms *c* (herein called the first pulse train) and *e* are respectively produced. The periods of these two pulse waveforms *c* and *e* are respectively an integral multiple of the period H of the horizontal synchronizing signal and have a mutual phase relationship wherein the phase of one is delayed by NH relative to the phase of the other.

Then, of the pulse waveforms *c* and *e*, one pulse waveform (*c* in the example illustrated) is delayed by one-half of the horizontal scanning period H by the delaying circuit 5 to produce a pulse waveform *d*. At the same time, the other pulse waveform (*e* in the example illustrated) is polarity converted by the polarity converter 6 to produce a pulse waveform *f* (herein called the second pulse train). The combination of this pulse waveform *f* and the pulse waveform *d* produces a resultant pulse train *g* which is delayed by H/2 at every other pulse. This pulse train *g* is used to trigger a generator such as a vertical deflection-driving pulse generator or a vertical synchronizing signal generator constituting the oscillator 7, whereby a vertical synchronizing signal capable of effecting full interlaced scanning can be produced.

It is to be noted that the positional order of the rectifier 3 and the delaying circuit 5 may be reversed. Furthermore, the positional order of the rectifier 4 and the polarity converter 6 can be reversed, in which case the rectifier 4 can be of the same polarity as the rectifier 3.

Figure 3:
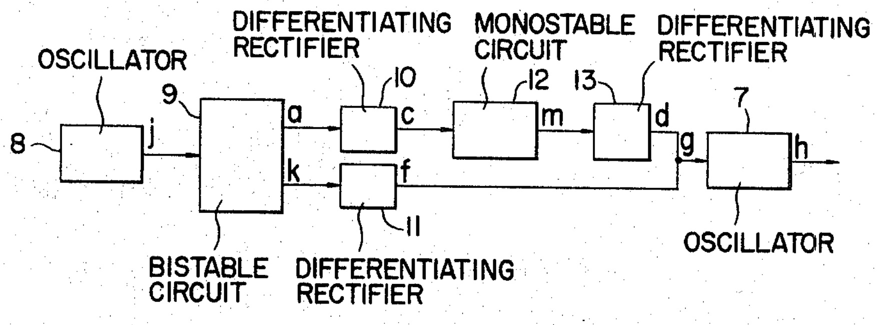

FIG. 3 illustrates another embodiment of the invention constituting an improvement of the generator described above and illustrated in FIG. 1. When an ordinary astable multivibrator or the like is used for the rectangular wave oscillator 1 in the generator shown in FIG. 1, it is difficult to maintain the duty factor accurately at 50 percent.

Figure 4:
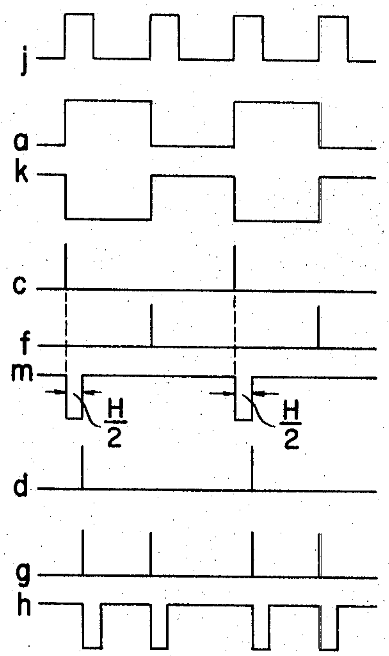
FIG. 4 is a similar time chart indicating voltage waveforms at various parts in the generator illustrated in FIG. 3.

In the example illustrated in FIG. 3 which is improved to overcome the above-mentioned difficulty, the output *j* (as indicated in FIG. 4) of an oscillator 8, which is a multivibrator or a blocking oscillator for oscillating with a period NH, is used to trigger a bistable circuit 9, whereupon a rectangular wave output *a* such that the period is 2NH with a duty factor accurately maintained at 50 percent is obtained.

When a bistable multivibrator in which use is made of elements such as vacuum tubes (valves) or transistors is utilized for the bistable circuit 9, an output *a* is obtained from the anode or collector on one side, while an output *k* (a rectangular wave signal of a phase opposite that of output *a*) is obtained from the anode or collector on the other side. When a multivibrator is not used for the bistable circuit, only the output *a* can be obtained in some cases. Accordingly, in such cases, the polarity of output *a* is converted by the use of a polarity converter thereby to produce an output *k*.

The rectangular wave output *a* is then passed through a circuit 10 for differentiating and rectifying (hereinafter referred to a differentiating rectifier), whereupon a pulse train *c* is obtained as an output thereof. A monostable circuit 12 is triggered by this pulse train *c* (the first pulse train), whereupon the output of this circuit 12 becomes a pulse train *m* having a certain width. Accordingly, by setting this pulse width at a value such that it is equal to one-half of the horizontal scanning period H, the output of a differentiating rectifier 13 into which the pulse train *m* is introduced can be caused to be a pulse train *d* which is delayed by H/2 relative to the pulse train *c*.

On one hand, when the rectangular wave output *k* is passed through a differentiating rectifier 11, a pulse train *f* is produced by rectifier 11 as its output. Accordingly, a resultant pulse train *g*, resulting from the additive combination of this pulse train *f* (the second pulse train) and the pulse train *d*, with every other pulse delayed by H/2, can be obtained, similarly as in the case of the aforedescribed example. This pulse train *g* triggers an oscillator 7, whereupon an output signal *h* is produced and used as the vertical synchronizing signal, whereby full interlacing operation is made possible.

Figure 5:
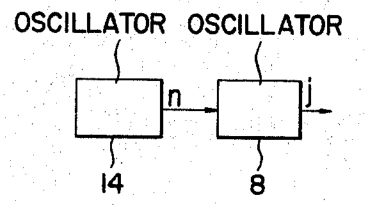
FIG. 5 is a partial block diagram for a description of another example of organization of one part of the generator illustrated in FIG. 3.
Figure 6:
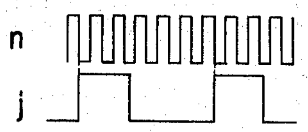
FIG. 6 is a graphical time chart indicating waveforms at paths *n* and *j* in the arrangement illustrated in FIG. 5.

While the apparatuses of the above-described two examples afford full interlacing, there is no provision for a definite phase relationship between the horizontal deflection and the vertical deflection. For this reason, the scanning lines continually move vertically and give rise to flickering of the picture. Therefore, for the purpose of correcting this deficiency, the oscillator 8 for oscillating with a substantially vertical deflection frequency (e.g., 60 Hz.) is synchronized by an oscillator 14 for oscillating with a horizontal deflection frequency (e.g., 15,750 Hz.) as indicated in FIG. 5. By this provision, a specific phase relationship is established and maintained between the horizontal and vertical deflections as indicated by output waveforms *n* and *j* shown in FIG. 6, whereby the scanning lines do not move vertically and become substantially fixed. In this case, the period of oscillator 8 becomes NH.

In the example illustrated in FIG. 3, pulse delay is accomplished by the monostable circuit 12, but in the case wherein the pulse width of the output *m* of this monostable circuit 12 cannot be maintained accurately at H/2 because of poor stability of the circuit 12 or poor stability of the horizontal deflection frequency (which determines the horizontal scanning period H), it is not possible to accomplish full interlacing.

Figure 7:
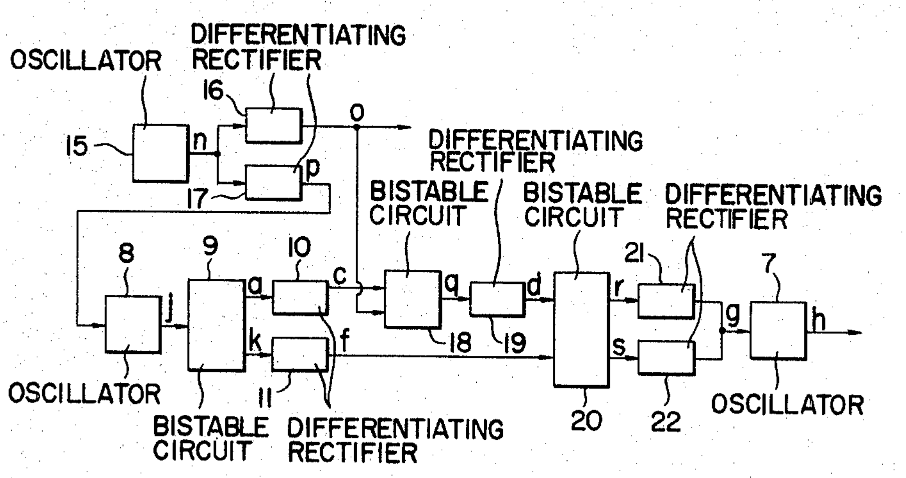
Figure 8:
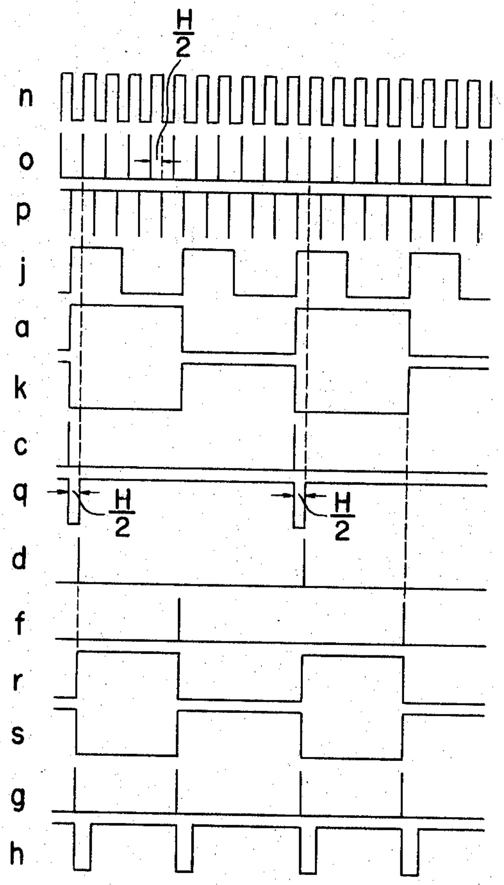
FIG. 8 is a graphical time chart indicating the voltage waveforms at various parts of the generator illustrated in FIG. 7.

Accordingly, in a further embodiment of the invention as illustrated in FIG. 7, the apparatus is so organized that full interlacing can be achieved even when the above-mentioned stabilities are poor. More specifically, the apparatus, in which the voltage waveforms at various parts thereof are as indicated in FIG. 8, operates in the following manner. The output *n* of a rectangular wave oscillator 15 of a duty factor of 50 percent for oscillating at the horizontal deflection frequency is transformed by differentiating rectifiers 16 and 17 (these two rectifiers being of mutually opposite polarity) into respectively positive and negative pulse trains *o* and *p*.

The phase relationship between pulse train *o* (herein called the third pulse train) and pulse train *p* (herein called the fourth pulse train) becomes such that the phase of one becomes delayed with respect to the other by H/2 (where H is the horizontal scanning period). Depending on the necessity, these pulse trains are subjected to polarity conversion.

Then, one of the two pulse trains, for example, pulse train *p* is used to trigger an oscillator 8 (such as, for example, a multivibrator or a blocking oscillator) for oscillating at the vertical deflection frequency, whereupon an output *j* (of a period NH) with a rise or fall in synchronism with the pulse train *p* is obtained. This output *j* is used to cause a bistable circuit 9 to operate and produce outputs *a* and *k*, which, upon being passed through differentiating rectifiers 10 and 11, cause pulse trains *c* (the first pulse train) and *f* (the second pulse train) to be produced. Since the organization and operation of the bistable circuit 9 and the differentiating rectifiers 10 and 11 are exactly the same as these in the example illustrated in FIG. 3, further detailed description thereof will be omitted.

A bistable circuit 18 is triggered by one of the pulse trains *c* and *f* obtained from the differentiating rectifiers 10 and 11, for example, pulse train *c* (the first pulse train) and the other pulse train *o* (the third pulse train), i.e., other than the pulse train *p*, of the differentiating rectifiers 16 and 17. The bistable circuit 18 is so adapted that it is closed by pulse train *c* and opened by pulse train *o* or is opened by pulse train *c* and closed by pulse train *o*.

The output of the bistable circuit 18 is *q*, and the time interval between opening and closing or the time interval between closing and opening is precisely H/2 (where H is the horizontal scanning period). This output *q* is passed through a suitable differentiating rectifier 19 whereby a pulse train *d* which is delayed by precisely H/2 relative to pulse train *c* is obtained. This pulse train *d*, in conjunction with the aforementioned pulse train *f*, causes a bistable circuit 20 to operate to produce an output *r* or *s*, which are of mutually opposite polarity. In the case when only output *r* can be obtained, its polarity is converted to produce output *s*.

The outputs *r* and *s* are passed respectively through suitable differentiating rectifiers 21 and 22, the outputs of which are combined to produce a pulse train *g* which is delayed by H/2 at every other pulse as described hereinabove with respect to a preceding example is obtained. Accordingly, this combined output *g* is used to operate an oscillator 7 whereby the desired vertical synchronizing signal signed *h* is obtained.

Alternatively, by combining directly the pulse trains *d* and *f* for operating the aforementioned bistable circuit 20, it is also possible to obtain a pulse train *g* which is delayed by H/2 at every other pulse. Accordingly, it is also possible to operate the oscillator 7 directly with this pulse train *g*.

Although it is not absolutely necessary in all cases, the bistable circuit 20 unifies the output levels of its outputs *r* and *s* and thereby has the effect of causing the oscillator 7 to operate stably. Therefore, this bistable circuit can be suitably inserted also in each of the preceding examples of apparatus.

Figure 9:
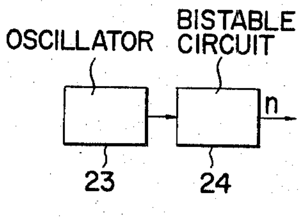
FIGS. 9 and 10 are partial block diagrams for descriptions of other examples of organization of a part of the generator illustrated in FIG. 7.
Figure 10:
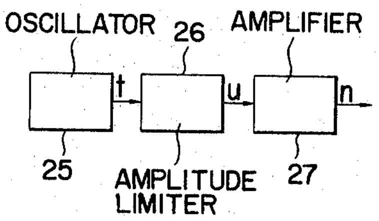

Specific examples of the rectangular wave oscillator 15 for waves of 50-percent duty factor for oscillation with the horizontal deflection frequency in the apparatus example illustrated in FIG. 7 are indicated by block diagrams in FIGS. 9 and 10.

Figure 11:
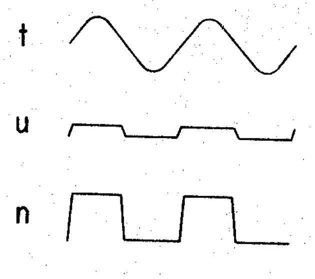
FIG. 11 is a graphical time chart indicating the waveforms at output paths of the arrangement indicated in FIG. 10.

The example illustrated in FIG. 9 comprises an oscillator 23 for oscillating with a frequency which is twice the horizontal deflection frequency and a bistable circuit 24 operated by the output of the oscillator 23 to produce a rectangular wave output *n* of 50-percent duty factor and with a frequency equal to the horizontal deflection frequency. The other example illustrated in FIG. 10 comprises a sine wave oscillator 25 for oscillating with the horizontal deflection frequency, an amplitude limiter 26 for limiting the amplitude of the output $t$ (as indicated in FIG. 11) of the oscillator 25 to a suitable value and producing an output $u$, and an amplifier 27 for amplifying the output $u$ to produce a rectangular wave output $n$.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention as set forth in the appended claims.

We claim:

1. A generator for generating a television vertical synchronizing signal for use in combination with a horizontal synchronizing signal comprising: rectangular wave generating means including a first oscillator for generating rectangular waves of 50-percent duty factor having a period equal to 2N (where N is an integer) times the period H of the horizontal synchronizing signal; means for producing from said rectangular waves first and second pulse trains respectively having a repetition period of 2NH and having phases mutually differing by NH; delay means for causing the phase of one of the first and second pulse trains to be delayed by H/2 relative to the phase of the other pulse train; means for combining the pulse train thus delayed with the other pulse train to produce composite pulses; and means including a second oscillator for generating vertical synchronizing pulses of a period equal to the period of said composite pulses.

2. A generator for generating a television vertical synchronizing signal for use in combination with a horizontal synchronizing signal comprising:
 rectangular wave generating means to generate rectangular waves of 50-percent duty factor having a period equal to 2N (where N is an integer) times the period H of the horizontal synchronizing signal and comprising a pulse signal oscillator operating with a repetition period of NH, and a bistable circuit operated by the pulse signal oscillator;
 means to produce from said rectangular waves first and second pulse trains respectively having a repetition period of 2NH and having phases mutually differing by NH;
 delay means to cause the phase of one of the first and second pulse trains to be delayed by H/2 relative to the phase of the other pulse train, and comprising a monostable circuit operated by the first pulse train to generate output pulses of an output pulse width equal to one-half of the period H of the horizontal synchronizing signals and a circuit for differentiating and rectifying said output pulses;
 means to combine the pulse train thus delayed with the other pulse train to produce composite pulses; and
 means to generate vertical synchronizing pulses of a period equal to the period of said composite pulses.

3. A generator for generating a television vertical synchronizing signal for use in combination with a horizontal synchronizing signal comprising:
 rectangular wave generating means to generate rectangular waves of 50-percent duty factor having a period equal to 2N (where N is an integer) times the period H of the horizontal synchronizing signal and comprising an oscillator which oscillates at the period of about 2N, said oscillator being triggered by said horizontal synchronizing signal, and a bistable circuit operated by the output of said oscillator;
 means to produce from said rectangular waves first and second pulse trains respectively having a repetition period of 2NH and having phases mutually differing by NH;
 delay means to cause the phase of one of the first and second pulse trains to be delayed by H/2 relative to the phase of the other pulse train, and comprising a monostable circuit operated by the first pulse train to generate output pulses of an output pulse width equal to one-half of the period H of the horizontal synchronizing signals and a circuit for differentiating and rectifying said output pulses;
 means to combine the pulse train thus delayed with the other pulse train to produce composite pulses; and
 means to generate vertical synchronizing pulses of a period equal to the period of said composite pulses.

4. A generator for generating a television vertical synchronizing signal for use in combination with a horizontal synchronizing signal comprising:
 rectangular wave generating means to generate rectangular waves of 50-percent duty factor having a period equal to 2N (where N is an integer) times the period H of the horizontal synchronizing signal and comprising an oscillator which oscillates at the period of about 2N, said oscillator being triggered by said horizontal synchronizing signal, a bistable circuit operated by the output of said oscillator;
 means to produce from said rectangular waves first and second pulse trains respectively having a repetition period of 2NH and having phases mutually differing by NH;
 a rectangular wave oscillator to generate waves of 50-percent duty factor with the horizontal synchronizing signal period H;
 means for differentiating and rectifying the output of the rectangular wave oscillator to produce third and fourth pulse trains having respective phases, one of which is delayed relative to the other by one-half of the horizontal synchronizing signal period H, the oscillator to oscillate at the period of about 2NH being adapted to synchronize with the fourth pulse train;
 delay means to cause the phase of one of the first and second pulse trains to be delayed by H/2 relative to the phase of the pulse train, and comprising a bistable circuit operated by the first and third pulse trains and a circuit for differentiating and rectifying the output of said bistable circuit;
 means to combine the pulse train thus delayed with the other pulse train to produce composite pulses; and
 means to generate vertical synchronizing pulses of a period equal to the period of said composite pulses.

5. A generator for generating a television vertical synchronizing signal for use in combination with a horizontal synchronizing signal comprising:
 rectangular wave generating means to generate rectangular waves of 50-percent duty factor having a period equal to 2N (where N is an integer) times the period H of the horizontal synchronizing signal and comprising a pulse signal oscillator operating with a repetition period of NH, and a bistable circuit operated by the pulse signal oscillator;
 means to produce from said rectangular waves first and second pulse trains respectively having a repetition period of 2NH and having phases mutually differing by NH;
 delay means to cause the phase of one of the first and second pulse trains to be delayed by H/2 relative to the phase of the other pulse train, and comprising a monostable circuit operated by the first pulse train to generate output pulses of an output pulse width equal to one-half of the period H of the horizontal synchronizing signals and a circuit for differentiating and rectifying said output pulses;
 means to combine the pulse train thus delayed with the other pulse train to produce composite pulses;
 means to generate vertical synchronizing pulses of a period equal to the period of said composite pulses; and
 a bistable circuit operated by the output of the delay means and the second pulse train and means for differentiating and rectifying means being applied to said combining means.